United States Patent [19]
Xu

[11] Patent Number: 5,306,427
[45] Date of Patent: Apr. 26, 1994

[54] LOW PRESSURE FEED MEMBRANE SEPARATION PROCESS

[75] Inventor: Jianguo Xu, Fogelsville, Pa.

[73] Assignee: Permea, Inc., St. Louis, Mo.

[21] Appl. No.: 90,376

[22] Filed: Jul. 12, 1993

Related U.S. Application Data

[63] Continuation-in-part of Ser. No. 993,153, Dec. 18, 1992, abandoned.

[51] Int. Cl.$^5$ ............................................. B01D 61/36
[52] U.S. Cl. ................................. 210/640; 210/641; 210/644; 210/649
[58] Field of Search ........ 210/634, 640, 644, 649–654, 210/321.6, 321.64, 321.72, 641; 55/16, 158

[56] References Cited

U.S. PATENT DOCUMENTS 4,944,882  7/1990  Ray et al. .............................. 210/640
5,185,014  2/1993  Prasad ...................................... 55/16

Primary Examiner—Frank Sever
Attorney, Agent, or Firm—Robert J. Wolff; James C. Simmons; William F. Marsh

[57] ABSTRACT

A process is set forth for the separation of one or more, more permeable components from one or more, less permeable components in a feed stream. The process suggests two membrane separation stages in series wherein the feed is introduced into the low pressure side of the first stage, the permeate stream from the first stage is compressed and introduced into the high pressure side of the second stage and wherein the non-permeate stream from the second stage is recycled to the high pressure side of the first stage.

4 Claims, 4 Drawing Sheets

LOW PRESSURE FEED MEMBRANE SEPARATION PROCESS

This application is a continuation-in-part of U.S. application Ser. No. 07/993,153, filed Dec. 18, 1992 now abandoned.

TECHNICAL FIELD

The present invention relates to a membrane separation process which uses a plurality of semi-permeable membranes in series for the separation of one or more, more permeable components from one or more, less permeable components in a feed stream. As used herein, the term component generally refers to, but is not limited to, a component in the gaseous state.

BACKGROUND OF THE INVENTION

Membrane separation processes which use a plurality of semi-permeable membranes in series for the separation of one or more, more permeable components from one or more, less permeable components in a feed stream are known in the art. A state of the art example is the "series type two unit separation cell" process as shown in FIG. 1 which recovers both the permeable and non-permeable components at desired purity while using an optimum combination of power and membrane area vis-a-vis any comparable process. Referring now to FIG. 1, a feed stream F2 comprising one or more, more permeable components and one or more, less permeable components is introduced into the high pressure side of membrane separation module M1. M1's high pressure side is separated from its low pressure side by a semi-permeable membrane which is selective for the permeation of the more permeable component(s). A first non-permeate stream NP1 which is enriched in the less permeable component(s) of the feed stream is withdrawn from the high pressure side of M1 and introduced into the high pressure side of membrane separation module M2. Similar to M1, M2's high pressure side is separated from its low pressure side by a semi-permeable membrane which is selective for the permeation of the more permeable component(s). A second non-permeate stream NP2 which is further enriched in the less permeable component(s) is withdrawn from the high pressure side of M2 and recovered as a first product stream. A first permeate stream P1 which is enriched in the more permeable component(s) is withdrawn from the low pressure side of M2, combined with the incoming feed stream F1, compressed in compressor C1 and finally recycled to the high pressure side of M1. A second permeate stream P2 which is further enriched in the more permeable component(s) is withdrawn from the low pressure side of M1 as a second product stream.

It is an object of the present invention to recover either or both of the permeable and non-permeable components at desired purity while using an optimum combination of power and membrane area vis-a-vis any comparable process, including the state of the art process shown in FIG. 1.

SUMMARY OF THE INVENTION

The present invention is a process for the separation of one or more, more permeable components from one or more, less permeable components in a feed stream comprising:

(a) introducing the feed stream into a first membrane separation module comprising a high pressure side separated from a low pressure side by a semi-permeable membrane which is selective for the permeation of the more permeable component(s) wherein the feed stream is more specifically introduced into the low pressure side of the first module;

(b) withdrawing from the low pressure side of the first module a first permeate stream enriched in the more permeable component(s);

(c) compressing the first permeate stream and introducing the compressed first permeate stream into a second membrane separation module comprising a high pressure side separated from a low pressure side by a semi-permeable membrane which is selective for the permeation of the more permeable component(s) wherein the first non-permeate stream is more specifically introduced into the high pressure side of the second module;

(d) withdrawing from the low pressure side of the second module a second permeate stream which is further enriched in the more permeable component(s);

(e) withdrawing from the high pressure side of the second module a first non-permeate stream which is enriched in the less permeable component(s);

(f) introducing the first non-permeate stream into the high pressure side of the first module; and (g) withdrawing from the high pressure side of the first membrane separation module a second non-permeate stream which is further enriched in the less permeable component(s).

BRIEF DESCRIPTION OF THE DRAWINGS

FIG. 2 is the simplest embodiment of the present invention in that it exclusively comprises steps (a) thru (g) of claim 1.

FIG. 3 is identical to FIG. 2 except for the addition of a third membrane module to the left side of FIG. 2. The purpose of the additional module is to achieve a similar purity of the less permeable component(s) vis-a-vis FIG. 1 so that a valid comparison can be made between FIG. 3 and FIG. 1.

FIG. 4 is identical to FIG. 3 except FIG. 3's middle membrane separation module is divided into three stages such that the permeate stream from one stage is compressed before being introduced as a sweep stream to the next stage.

DETAILED DESCRIPTION OF THE INVENTION

The process of the present invention will be described in detail with reference to the drawings.

Figure 2:
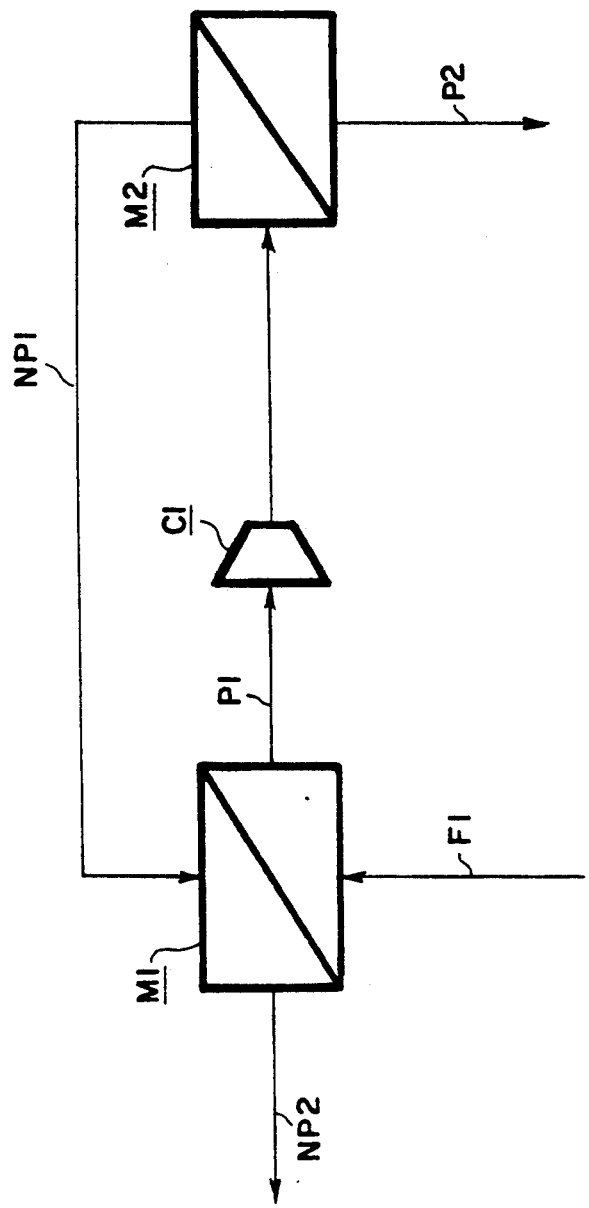
FIG. 2 is a schematic diagram illustrating one embodiment of the present invention.

As noted above, FIG. 2 is the simplest embodiment of the present invention in that it exclusively comprises steps (a) thru (g) of claim 1. Referring now to FIG. 2, a feed stream F1 comprising one or more, more permeable components and one or more, less permeable components is introduced into the low pressure side of membrane separation module M1. M1's high pressure side is separated from its low pressure side by a semi-permeable membrane which is selective for the permeation of the more permeable component(s). A first permeate stream P1 which is enriched in the more permeable component(s) of the feed stream is withdrawn from the low pressure side of M1, compressed in compressor C1 and introduced into the high pressure side of membrane separation module M2. Similar to M1, M2's high pressure side is separated from its low pressure side by a semi-permeable membrane which is selective for the permeation of the more permeable component(s). Although not shown in FIG. 2, a sweep stream can be introduced into the low pressure side of M2. A second permeate stream P2 which is further enriched in the more permeable component(s) is withdrawn from the low pressure side of M2 and recovered as a first product stream. A first non-permeate stream NP1 which is enriched in the less permeable component(s) is withdrawn from the high pressure side of M2 and introduced into the high pressure side of M1. A second non-permeate stream NP2 which is further enriched in the less permeable component(s) is withdrawn from the high pressure side of M1 as a second product stream. As shown in FIG. 2, the above described steps are operated as a continuous cycle.

Figure 3:
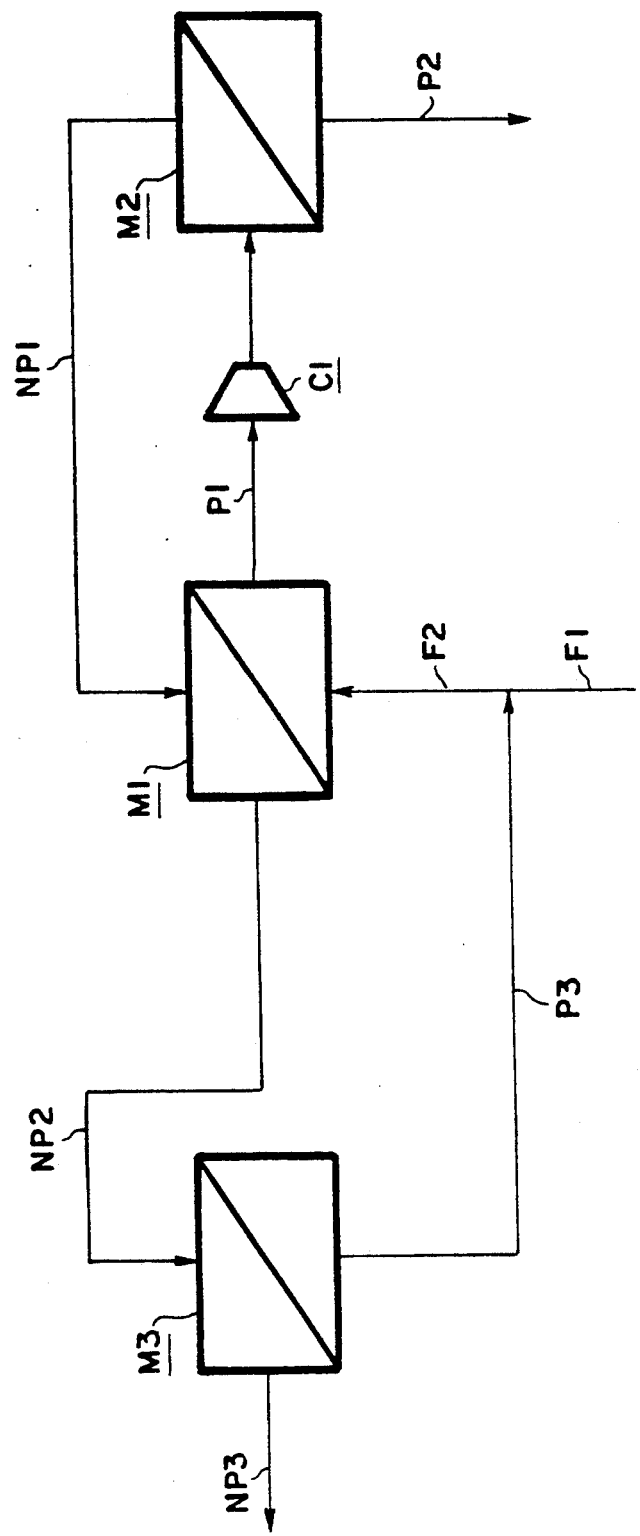
FIG. 3 is a schematic diagram illustrating a second embodiment of the present invention.

FIG. 3 is a schematic diagram illustrating a second embodiment of the present invention. FIG. 3 is identical to FIG. 2 except for the addition of a third membrane module to the left side of FIG. 2. The purpose of the additional module is to achieve a similar purity of the less permeable component(s) vis-a-vis FIG. 1 so that a valid comparison can be made between FIG. 3 and FIG. 1 as is done in Example 1. Referring now to FIG. 3, a feed stream F2 comprising one or more, more permeable components and one or more, less permeable components is introduced into the low pressure side of the first membrane separation module M1. M1's high pressure side is separated from its low pressure side by a semi-permeable membrane which is selective for the permeation of the more permeable component(s). A first permeate stream P1 which is enriched in the more permeable component(s) of the feed stream is withdrawn from the low pressure side of M1, compressed in compressor C1 and introduced into the high pressure side of membrane separation module M2. Similar to M1, M2's high pressure side is separated from its low pressure side by a semi-permeable membrane which is selective for the permeation of the more permeable component(s). Although not shown in FIG. 3, a sweep stream can be introduced into the low pressure side of M2. A second permeate stream P2 which is further enriched in the more permeable component(s) is withdrawn from the low pressure side of M2 and recovered as a first product stream. A first non-permeate stream NP1 which is enriched in the less permeable component(s) is withdrawn from the high pressure side of M2 and introduced into the high pressure side of M1. A second non-permeate stream NP2 which is further enriched in the less permeable component(s) is withdrawn from the high pressure side of M1 and introduced into the high pressure side of M3. Similar to M1 and M2, M3's high pressure side is separated from its low pressure side by a semi-permeable membrane which is selective for the permeation of the more permeable component(s). Although not shown in FIG. 3, a sweep stream can be introduced into the low pressure side of M3. A third non-permeate stream NP3 which is still further enriched in the less permeable component(s) is withdrawn from the high pressure side of M3 and recovered as a second product stream. A third permeate stream P3 which is enriched in the more permeable component(s) is withdrawn from the low pressure side of M3, combined with the incoming feed stream F1 and finally recycled to the low pressure side of M1.

Figure 4:
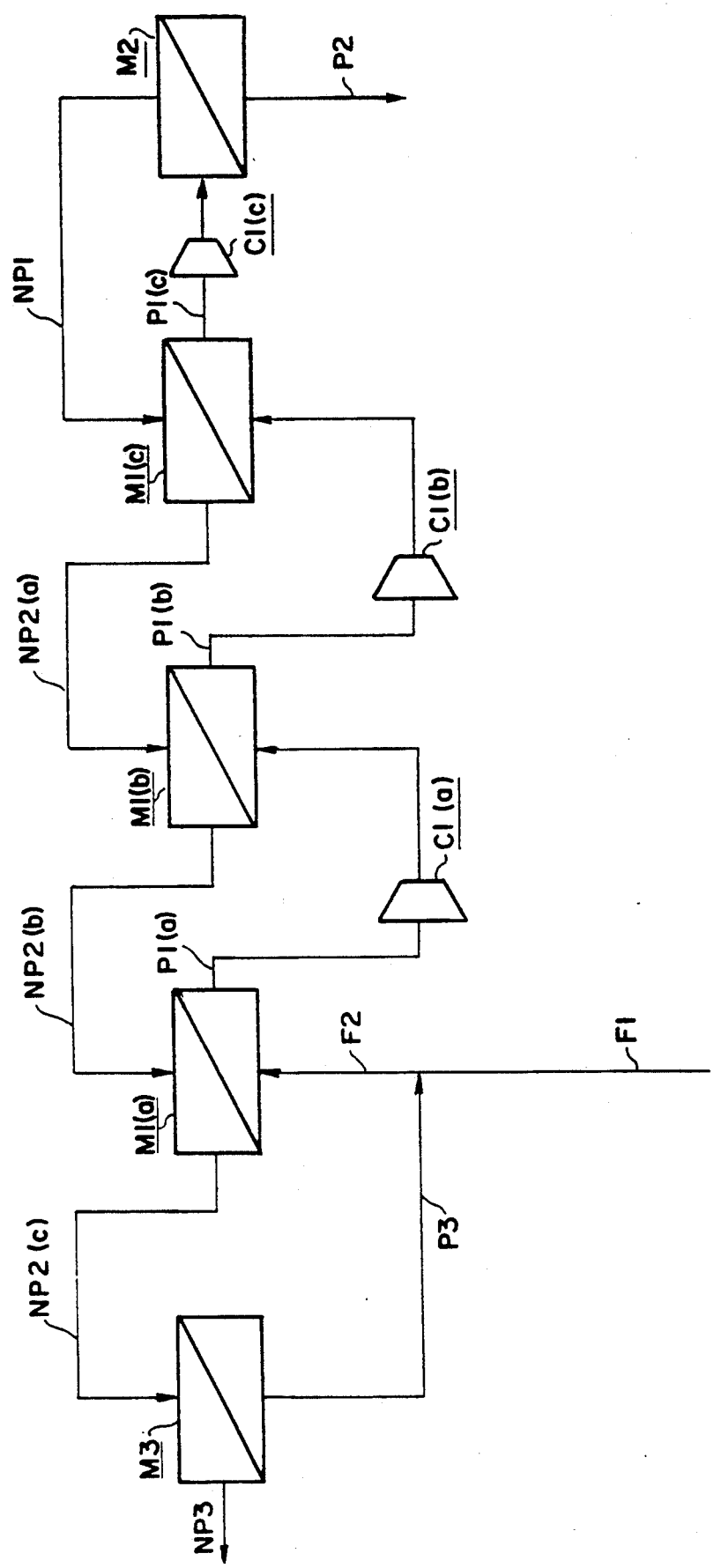
FIG. 4 is a schematic diagram illustrating a third embodiment of the present invention.

FIG. 4 is a schematic diagram illustrating a third embodiment of the present invention. FIG. 4 is identical to FIG. 3 except FIG. 3's middle membrane separation module is divided into three stages such that the permeate stream from one stage is compressed before being introduced as a sweep stream to the next stage. Referring now to FIG. 4, a feed stream F2 comprising one or more, more permeable components and one or more, less permeable components is introduced into the low pressure side of the first membrane separation module M1(a). M1(a)'s high pressure side is separated from its low pressure side by a semi-permeable membrane which is selective for the permeation of the more permeable component(s). An initial first permeate stream P1(a) which is enriched in the more permeable component(s) of the feed stream is withdrawn from the low pressure side of M1(a), compressed in compressor C1(a) and introduced into the low pressure side of membrane separation module M1(b). Similar to M1(a), M1(b)'s high pressure side is separated from its low pressure side by a semi-permeable membrane which is selective for the permeation of the more permeable component(s). An intermediate first permeate stream P1(b) which is further enriched in the more permeable component(s) of the feed stream is withdrawn from the low pressure side of M1(b), compressed in compressor C1(b) and introduced into the low pressure side of membrane separation module M1(c). Similar to M1(a) and M1(b), M1(c)'s high pressure side is separated from its low pressure side by a semi-permeable membrane which is selective for the permeation of the more permeable component(s). A final first permeate stream P1(c) which is still further enriched in the more permeable component(s) of the feed stream is withdrawn from the low pressure side of M1(c), compressed in compressor C1(c) and introduced into the high pressure side of membrane separation module M2. Similar to the other modules, M2's high pressure side is separated from its low pressure side by a semi-permeable membrane which is selective for the permeation of the more permeable component(s). Although not shown in FIG. 3, a sweep stream can be introduced into the low pressure side of M2. A second permeate stream P2 which is yet further enriched in the more permeable component(s) is withdrawn from the low pressure side of M2 and recovered as a first product stream. A first non-permeate stream NP1 which is enriched in the less permeable component(s) is withdrawn from the high pressure side of M2 and introduced into the high pressure side of M1(c). An initial second non-permeate stream NP2(a) which is further enriched in the less permeable component(s) is withdrawn from the high pressure side of M1(c) and introduced into the high pressure side of M1(b). An intermediate second non-permeate stream NP2(b) which is still further enriched in the less permeable component(s) is withdrawn from the high pressure side of M1(b) and introduced into the high pressure side of M1(a). A final second non-permeate stream NP2(c) which is yet further enriched in the less permeable component(s) is withdrawn from the high pressure side of M1(a) and introduced into the high pressure side of M3. Similar to the other modules, M3's high pressure side is separated from its low pressure side by a semi-permeable membrane which is selective for the permeation of the more permeable component(s). Although not shown in FIG. 3, a sweep stream can be introduced into the low pressure side of M3. A third non-permeate stream NP3 which is yet further enriched in the less permeable component(s) is withdrawn from the high pressure side of M3 and recovered as a second product stream. A third permeate stream P3 which is enriched in the more permeable component(s) is withdrawn from the low pressure side of M3, combined with the incoming feed stream F1 and finally recycled to the low pressure side of M1(a).

The following examples are offered to demonstrate the efficacy of the present invention. These examples are all in the context of a feed stream comprising hydrogen as the one or more, more permeable component(s) and carbon monoxide as the one or more, less permeable component(s). In addition to encompassing this separation, the present invention also encompasses separations wherein the feed stream comprises a mixture selected from the group consisting of:

(1) hydrogen as the one or more, more permeable component(s) and carbon monoxide as the one or more, less permeable component(s);

(2) hydrogen as the one or more, more permeable component(s) and carbon dioxide as the one or more, less permeable component(s);

(3) hydrogen as the one or more, more permeable component(s) and methane as the one or more, less permeable component(s);

(4) hydrogen as the one or more, more permeable component(s) and nitrogen as the one or more, less permeable component(s);

(5) nitrogen as the one or more, more permeable component(s) and methane as the one or more, less permeable component(s); and (6) carbon dioxide as the one or more, more permeable component(s) and nitrogen, oxygen and argon as the one or more, less permeable component(s).

It should be noted that the present invention's cycle is not particularly suitable for separations wherein oxygen is the one or more, more permeable component(s) and nitrogen is the one or more, less permeable component(s). This is due to the selectivity/permeability limitations associated with such a separation.

EXAMPLE 1

Figure 1:
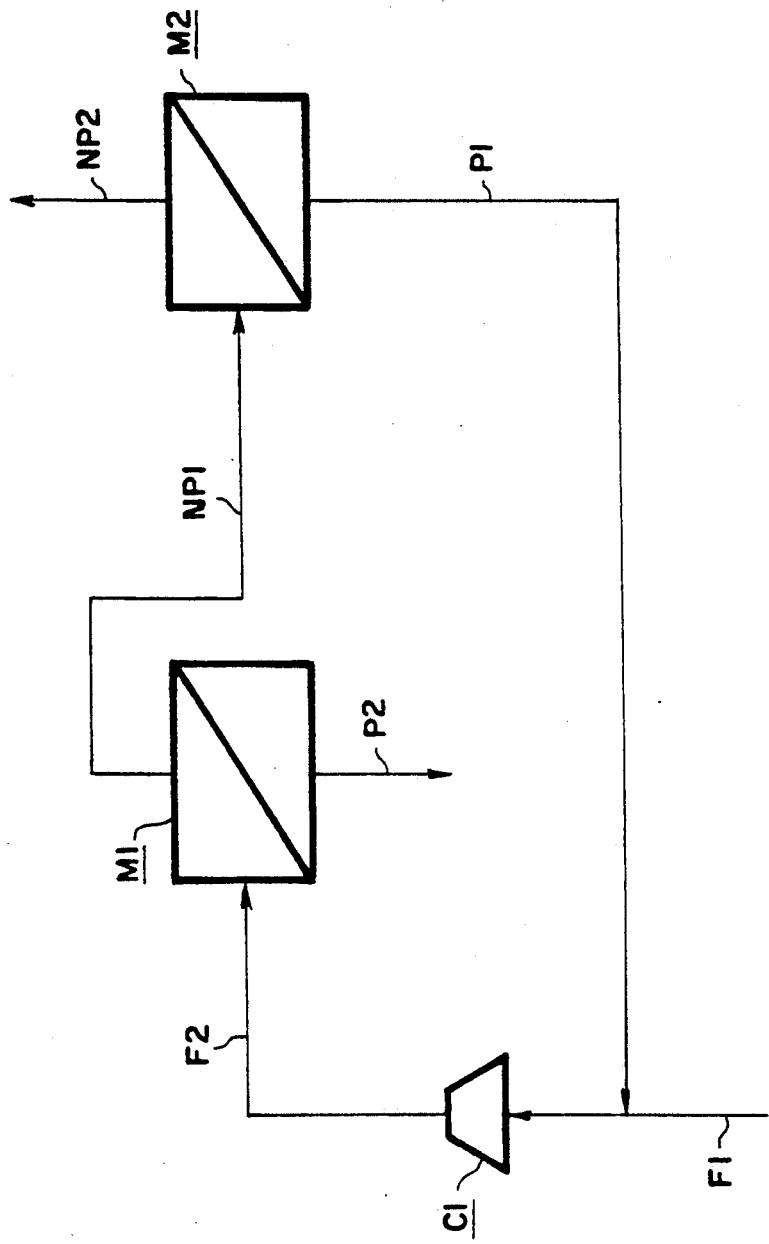
FIG. 1 is a schematic diagram of a prior art process for the separation of one or more, more permeable components from one or more, less permeable components in a feed stream using two membrane separation modules in series.

The purpose of this example is to demonstrate the improved efficiency of the present invention (as embodied in FIG. 3) over the prior art (as embodied in FIG. 1). This was accomplished by performing computer simulations for FIGS. 1 and 3. Table 1 summarizes the common feed and product streams for the two simulations, Table 2 summarizes the common compressor inlet and outlet pressures for the two simulations and Table 3 summarizes the common membrane characteristics for the two simulations. Both simulations assume zero pressure drops in their respective systems as well as a counter-current flow pattern between the flows on the high pressure side and low pressure side of each separation module. Table 4 summarizes the relative power and membrane area for the two simulations. As shown in Table 4, FIG. 3 enjoys a 4% advantage in energy efficiency and a 5% advantage in membrane area over FIG. 1.

TABLE 1

| | Flow (lbmoles/hr) | Pressure (psia) | Composition (mole %) | |
|---|---|---|---|---|
| | | | Hydrogen | Carbon Monoxide |
| Feed Stream | 100.0 | 22.7 | 21.5 | 78.5 |
| Permeate Product | 21.3 | 41.7 | 99.0 | 1.0 |
| Non-Permeate Product | 78.7 | 402.7 | 0.5 | 99.5 |

TABLE 2

| | Inlet Pressure (psia) | Outlet Pressure (psia) |
|---|---|---|
| Compressor C1 (FIGS. 1 and 3) | 22.7 | 402.7 |

TABLE 3

| | Selectivity ($H_2$ relative to CO) | Permeability of Hydrogen (standard $cm^3/cm^2 \cdot sec \cdot cm\ Hg$) |
|---|---|---|
| Membrane Characteristics | 38 | $95 \times 10^{-6}$ |

TABLE 4

| | Relative Power | Relative Membrane Area |
|---|---|---|
| FIG. 1 | 1.0 | 1.0 |
| FIG. 3 | 0.96 | 0.95 |

EXAMPLE 2

The purpose of this example is to demonstrate how the efficiency of FIG. 3 as simulated in Example 1 can be further improved by varying the membrane selectivities in accordance with the teaching that it is often advantageous to use different selectivities (and thus different permeabilities since permeability decreases as selectivity increases) in a multi-stage membrane separator system. This was accomplished by performing an additional computer simulation for FIG. 3 wherein the only change from the original simulation for FIG. 3 is that the membrane selectivities were varies as shown in Table 5. Table 6 summarizes the relative power and membrane area for the two simulations of FIG. 3 (the additional simulation is identified as FIG. 3*). As shown in Table 6, FIG. 3* enjoys a 55% advantage in energy efficiency and an 8% advantage in membrane area over FIG. 3. As compared to the simulation of FIG. 1, FIG. 3* enjoys an 57% advantage in energy efficiency and an 13% advantage in membrane area.

TABLE 5

| | Selectivity ($H_2$ relative to CO) | Permeability of Hydrogen (standard $cm^3/cm^2 \cdot sec \cdot cm\ Hg$) |
|---|---|---|
| Module M1 and M3 | 38 | $95 \times 10^{-6}$ |
| Module M2 | 100 | $21.67 \times 10^{-6}$ |

TABLE 6

| | Relative Power | Relative Membrane Area |
|---|---|---|
| FIG. 1 | 1.0 | 1.0 |
| FIG. 3 | 0.96 | 0.95 |
| FIG. 3* | 0.43 | 0.87 |

EXAMPLE 3

The purpose of this example is to demonstrate how the efficiency of FIG. 3* as simulated in Example 2 can be still further improved by dividing M1 into three stages wherein the permeate stream from one stage is compressed before being introduced as a sweep stream to the next stage as shown in FIG. 4. This was accomplished by performing a computer simulation for FIG. 4 having the same feed and product streams as FIG. 3* (ie Table 1's feed and product streams) and the same membrane characteristics as the computer simulation for FIG. 3* (ie Table 5's membrane characteristics noting that the membrane characteristics of M1 are also the membrane characteristics for each of the three stages that M1 is divided into). Table 7 summarizes the compressor inlet and outlet pressures for FIG. 3* and FIG. 4. Table 8 summarizes the relative power and membrane area for FIG. 3* and FIG. 4. As shown in Table 8, FIG. 4 enjoys an 44% advantage in energy efficiency area over FIG. 3* at the expense of a 30% increase in membrane area. As compared to the simulation of FIG. 1, FIG. 4 enjoys a 76% advantage in energy efficiency at the expense of a 13% increase in membrane area.

TABLE 7

| | Inlet Pressure (psia) | Outlet Pressure (psia) |
|---|---|---|
| Compressor C1 in FIG. 3* | 22.7 | 402.7 |
| Compressor C1(a) in FIG. 4 | 22.7 | 100.0 |
| Compressor C1(b) in FIG. 4 | 100.0 | 200.0 |
| Compressor C1(c) in FIG. 4 | 200.0 | 402.7 |

TABLE 8

| | Relative Power | Relative Membrane Area |
|---|---|---|
| FIG. 1 | 1.0 | 1.0 |
| FIG. 3 | 0.96 | 0.95 |
| FIG. 3* | 0.43 | 0.87 |
| FIG. 4 | 0.24 | 1.13 |

The present invention has been described with reference to three specific embodiments thereof. These embodiments should not be seen as a limitation of the scope of the present invention; the scope of such being ascertained by the following claims.

What is claimed is:

1. A process for the separation of one or more, more permeable components from one or more, less permeable components in a feed stream comprising:
   (a) introducing the feed stream into a first membrane separation module comprising a high pressure side separated from a low pressure side by a semi-permeable membrane which is selective for the permeation of the more permeable component(s) wherein the feed stream is more specifically introduced into the low pressure side of the first module;
   (b) withdrawing from the low pressure side of the first module a first permeate stream enriched in the more permeable component(s);
   (c) compressing the first permeate stream and introducing the compressed first permeate stream into a second membrane separation module comprising a high pressure side separated from a low pressure side by a semi-permeable membrane which is selective for the permeation of the more permeable component(s) wherein the first non-permeate stream is more specifically introduced into the high pressure side of the second module;
   (d) withdrawing from the low pressure side of the second module a second permeate stream which is further enriched in the more permeable component(s);
   (e) withdrawing from the high pressure side of the second module a first non-permeate stream which is enriched in the less permeable component(s);
   (f) introducing the first non-permeate stream into the high pressure side of the first module; and
   (g) withdrawing from the high pressure side of the first membrane separation module a second non-permeate stream which is further enriched in the less permeable component(s) wherein the feed stream comprises a mixture selected from the group consisting of:
   (i) hydrogen as the one or more, more permeable component(s) and carbon monoxide as the one or more, less permeable component(s);
   (ii) hydrogen as the one or more, more permeable component(s) and carbon dioxide as the one or more, less permeable component(s);
   (iii) hydrogen as the one or more, more permeable component(s) and methane as the one or more, less permeable component(s);
   (iv) hydrogen as the one or more, more permeable component(s) and nitrogen as the one or more, less permeable component(s);
   (v) nitrogen as the one or more, more permeable component(s) and methane as the one or more, less permeable component(s); and
   (vi) carbon dioxide as the one or more, more permeable component(s) and nitrogen, oxygen and argon as the one or more, less permeable component(s).

2. The process of claim 1 wherein steps (a) through (g) are operated as a continuous cycle.

3. The process of claim 1 wherein the selectivity towards the more permeable component(s) of the semi-permeable membrane in the first module is different than the selectivity towards the more permeable component(s) of the semi-permeable membrane in the second module.

4. The process of claim 1 wherein the first module is divided into a plurality of stages such that the permeate stream from one stage is compressed before being introduced as a sweep stream to the next stage.

* * * * *